April 2, 1968     J. W. CRAYTON     3,376,489
REGULATED POWER SUPPLY
Filed Feb. 21, 1966
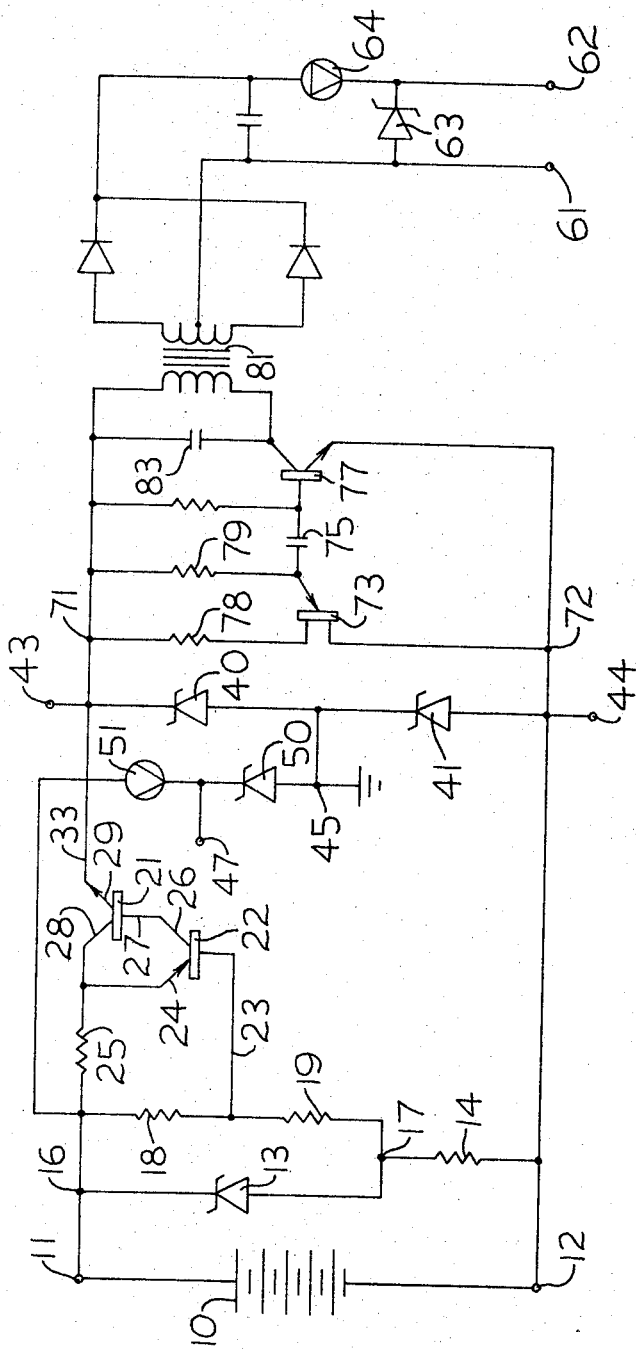
INVENTOR.
JOHN W. CRAYTON
ATTORNEYS

United States Patent Office 3,376,489
Patented Apr. 2, 1968

3,376,489
REGULATED POWER SUPPLY
John W. Crayton, Washington, Ill., assignor to Caterpillar Tractor Co., Peoria, Ill., a corporation of California
Filed Feb. 21, 1966, Ser. No. 529,009
7 Claims. (Cl. 321—2)

This invention relates generally to power supplies and more particularly to a transistorized power supply operative to provide a plurality of D.C. output potentials of exceptionally constant values from an eminently unstable voltage supply source such as the battery of a vehicle powered by a gas turbine engine.

It is not unusual for the modern day heavy earthmoving vehicle to contain sophisticated electronic control systems. In order for these systems to function within the precise limits expected of them, it is a prerequisite that their electrodes be supplied with various magnitudes of D.C. voltage the constancy of which does not deviate above or below a specified magnitude by a predetermined amount.

It is well known that earthmoving vehicles operating upon rugged terrain, are subjected to innumerable jolts and bounces making it highly impracticable to employ in conjunction with their electronic systems typically fragile voltage cells known for their inherent constant output potentials. Moreover, as the manner of electronic controls required by a vehicle increases, the power to energize them increases. This factor together with the ever-present requirements of compactness and economy has led the present day vehicle battery to be used more and more as the ultimate source of D.C electrical power to power and bias such electronic control systems.

It is well known that commercially available vehicle batteries are not designed nor capable of providing the critical degree of constancy in voltage magnitude required to power today's complex electronic circuits. Age, current drain, and switching are a few factors that tend to make the battery output voltage variable and highly unsuitable for such control systems unless its voltage is regulated.

While battery operated power supplies for electrical control systems are known, such prior art supplies have been found to be grossly inadequate when used in the environment of heavy earthmoving equipment. This is because the battery employed in today's earthmoving equipment is called upon to electrically power an increasingly large number of electrical components; consequently, the voltage input to the voltage regulator circuit of the power supply is widely variable and highly unregulated. It has been found that the voltage regulator circuits of these prior art power supplies when used in association with these widely variable and highly unregulated input voltages provide output electrode potentials which have untolerably poor constancy.

Accordingly, it is an object of the present invention to provide an improved battery operated power supply having a voltage regulator circuit which furnishes a plurality of D.C. electrode potentials the constancy of which meets the critical regulation requirements of complex electronic control systems such as those associated with gas turbine engines.

It is another object of the present invention to provide an improved battery operated power supply having a voltage regulator circuit which provides a plurality of D.C. electrode potentials of varying degrees of constancy.

It is yet another object of the present invention to provide a power converter circuit in the voltage regulator circuit of the power supply of the present invention, which operates as a three terminal closed loop constant current source, and which includes a pair of directly coupled complementary transistors.

It is still another object of the present invention to provide a power supply which is reliable, simple, and economical.

Still further and more specific objects and advantages of the present invention and the manner in which the invention is carried into practice are made apparent in the following specification wherein reference is made to the accompanying drawing which is an electrical circuit diagram of the present invention.

A battery 10 is connected across a pair of input terminals 11 and 12 to a voltage regulation portion of the present invention. It will be understood that, because of the demands made upon battery 10 by other electrical systems (not shown), the instantaneous magnitude of the voltage supplied by the battery to terminals 11 and 12 is widely variable and thus highly unregulated.

A Zener diode 13 serially connected with current limiting resistor 14 is connected across the battery. Zener diode 13 is oriented so as to be back biased by the battery and has a breakdown voltage which is less than the minimum voltage to be expected from the battery 10, thus assuring that a Zener current will always flow. Consequently, a first but low order of regulated voltage appears across the Zener diode at terminals 16 and 17. Resistors 18 and 19 are connected across Zener 13; hence, the first but low order of regulated voltage also appears across them. Resistors 18 and 19 provide a voltage divider action and the voltage across resistor 18 is the control voltage of the power converter circuit next to be described.

A power converter circuit is formed by resistor 25 and directly coupled, forward-biased NPN transistor 21 and complementary forward-biased PNP transistor 22, and has as its input the control voltage across resistor 18. The power converter circuit provides a constant current output over conductor 33 sufficient not only to drive and satisfy the heavy demand made by serially connected Zener diodes 40 and 41 but also to drive Zener diode 63 in a D.C.-A.C.-D.C. converter portion between terminals 71, 72.

In the power converter circuit the collector 26 of PNP transistor 22 is directly connected to the base 27 of NPN transistor 21 and the collector 28 of NPN transistor 21 is directly connected to emitter 24 of PNP transistor 22. Resistor 25 tends to hold the output current from emitter 29 constant over the swing of the input control voltage. One terminal of resistor 25 is connected to the junction of the emitter 24 of transistor 22 and the collector 28 of transistor 21 and the other terminal is connected to the positive side of the battery. The base 23 of transistor 22 is connected to the negative side of resistor 18.

The above described power converter circuit is an amplifier operating in a closed loop on current. Since both transistors 21 and 22 are in the forward part of the closed loop, the detrimental changes in transistor characteristics such as brought about by age and temperature are attenuated. Furthermore, in view of this attenuation the complementary transistors need not be matched to gain this constant current output from emitter 29.

While resistors 18 and 19 are shown as fixed resistors, it is, of course, within the scope of the present invention to use a potentiometer or variable resistors in their place. The use of a potentiometer or variable resistors will allow for a simplified change in the value of the control voltage across resistor 18. The required magnitude of this control voltage is dependent on the power level of transistors 21 and 22. This power level depends on the power capabilities of the particular pair of complementary transistors that are employed.

Serially connected Zener diodes 40 and 41, provide a second stage of voltage regulation. Midpoint 45 between these diodes is grounded. A pair of well-regulated output voltages suitable to provide the required electrode potentials for sophisticated electronic control systems may be taken from output terminals 43, 45, and 44, 45.

The power converter circuit is also powerful enough to drive Zener diode 63 in the D.C.-A.C.-D.C. circuitry next to be described and appearing between terminals 71, 72. Zener diode 63 provides a third stage of voltage regulation. The voltage output across its terminals 61, 62 is isolated from the pair of well regulated output voltages across terminals 43, 45 and 44, 45 and is relatively more regulated. While conventional circuitry is used to obtain the very well regulated voltage across output terminals 61, 62 the following brief description is given. The base terminals of a unijunction transistor 73 are connected to terminals 71 and 72 and across the sum of the well regulated voltages which appear acorss Zener diodes 40 and 41. The emitter of the unijunction transistor is connected through capacitor 75 to the base of forward-biased NPN transistor 77. Resistor 79 and capacitor 75 form a timing circuit which with the unijunction transistor and resistor 78 comprise an oscillator which has an output wave form approximating a sawtooth. The collector of transistor 77 is connected to the primary winding of a coupling transformer 81. A capacitor 83 allows the primary winding to be tuned to the oscillator frequency. The output from the oscillator is amplified by transistor 77 and an approximation of a sine wave voltage is fed to the primary winding. The output voltage from the secondary of the coupling transformer is full wave rectified, filtered, and fed to constant current device 64 and Zener diode 63. Thus the invention provides between terminals 61, 62 a third and very well regulated, isolated, output voltage from the widely variable and highly unregulated voltage of battery 10.

A fourth regulated output voltage similarly suited to provide a constant electrode potential can be taken from terminals 45, 47 of Zener diode 50. The anode of Zener diode 50 is grounded at 45 and its cathode is connected to one side of a conventional two-terminal constant current device 51. The other side of the constant current device is connected to the positive side of the battery.

Thus it can be seen that the invention provides from the widely variable supply voltage of battery 10 a pair of well regulated output voltages across terminals 43, 45 and 44, 45 and a third output voltage across terminals 61, 62 which is relatively more regulated than the former and isolated therefrom. Additionally a fourth regulated output voltage may be taken from the output terminals 45, 47 but unlike the former three output voltages, it does not depend upon the feature of the directly coupled pair of complementary transistors of the power converter circuit.

I claim:
1. A transistorized power supply for providing a plurality of constant output voltages of varying degrees of regulation over a widely variable range of D.C. input voltage comprising, in combination: a source of D.C. power; first voltage regulating means electrically disposed to receive the output of said source and including a first Zener diode which is back-biased by said source; voltage dividing means electrically associated with the regulated voltage output of said first voltage regulating means and operable to provide a control voltage output; power converter means electrically associated with said voltage dividing means and including a pair of complementary, directly coupled transistors and responsive to said control voltage to provide a constant current output; second voltage regulating means electrically disposed to receive the constant current output and comprising at least one Zener diode which is responsive to and back-biased by the constant current output to provide at least one constant output voltage across said second voltage regulating means.

2. The power supply of claim 1 further comprising D.C. to A.C. to D.C. voltage converting means also electrically associated with the constant current output from said power converter means and third voltage regulating means comprising a second Zener diode back-biased by and electrically disposed to receive the D.C. voltage output from said D.C. to A.C. to D.C. voltage converting means.

3. The power supply of claim 1 wherein said first voltage regulating means further includes a first resistor serially connected to the anode of the first Zener diode and wherein said power converter means further includes a second resistor connected between the positive side of said source and the junction of the emitter terminal of one of the pair of complementary directly coupled transistors and the collector terminal of the other of this pair of transistors.

4. The power supply of claim 2 wherein said first voltage regulating means further includes a first resistor serially connected to the anode of the first Zener diode and wherein said power converter means further includes a second resistor connected between the positive side of said source and the junction of the emitter terminal of one of the pair of complementary directly coupled transistors and the collector terminal of the other of this pair of transistors.

5. The power supply of claim 2 further comprising a two-terminal constant current device and a third Zener diode wherein one terminal of said two-terminal device is connected to the positive side of said source and the other terminal is connected to the cathode of said third Zener diode, the anode of said third Zener diode being grounded, to provide a regulated output voltage across said third Zener diode.

6. A closed loop constant current device having two input terminals and one output terminal and comprising in combination: a D.C. voltage source connected across the two input terminals; a first transistor having a base, a collector and an emitter; a second transistor complementary to said first transistor and having a base, a collector and an emitter; and a resistor; and wherein the first input terminal connects to the base of said first transistor, wherein the second input terminal connects to said resistor which serially connects to the junction of the emitter of the first transistor and the collector of the second transistor, the collector of the first transistor being directly connected to the base of the second transistor, and wherein the output terminal connects to the emitter of said second transistor.

7. The closed loop constant current device of claim 6 wherein said first transistor is of the PNP type and wherein said second transistor is of the NPN type.

References Cited
UNITED STATES PATENTS
3,311,813  3/1967  Sutcliffe _____ 323—4
3,317,817  5/1967  Gershen _____ 323—4
3,333,170  7/1967  Numakura et al. _____ 321—2 X JOHN F. COUCH, *Primary Examiner.*

W. H. BEHA, JR., *Assistant Examiner.*